United States Patent
Muharemovic et al.

(10) Patent No.: US 11,632,224 B2
(45) Date of Patent: *Apr. 18, 2023

(54) LEAKAGE AND NOISE CANCELLING FOR DOUBLE BALANCED DUPLEXERS

(71) Applicant: Apple Inc., Cupertino, CA (US)

(72) Inventors: Nedim Muharemovic, Nuremberg (DE); Joonhoi Hur, Sunnyvale, CA (US); Rastislav Vazny, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,171

(22) Filed: Jun. 3, 2022

(65) Prior Publication Data
US 2022/0303107 A1    Sep. 22, 2022

Related U.S. Application Data

(63) Continuation of application No. 17/065,397, filed on Oct. 7, 2020, now Pat. No. 11,424,900.

(51) Int. Cl.
*H04L 5/14*       (2006.01)
*H04B 17/10*   (2015.01)
*H04B 1/00*     (2006.01)

(52) U.S. Cl.
CPC ......... *H04L 5/1461* (2013.01); *H04B 17/104* (2015.01); *H04B 1/0067* (2013.01)

(58) Field of Classification Search
CPC ..... H04L 5/1461; H04L 1/0067; H04L 1/006; H04L 5/1423; H04B 17/104; H04B 17/00; H04B 1/10; H04B 1/1638
See application file for complete search history.

(56) References Cited

U.S. PATENT DOCUMENTS 8,228,137 B2   7/2012  Inoue et al.
8,655,299 B2 *  2/2014  Mirzaei ................... H04B 1/28
                                                                       455/280

(Continued)

FOREIGN PATENT DOCUMENTS

WO      2015021481 A    2/2015

OTHER PUBLICATIONS

Office Action for Korean Patent Application No. 10-2021-0133125 dated Sep. 22, 2022; 5 pgs.

(Continued)

*Primary Examiner* — Mewale A Ambaye
(74) *Attorney, Agent, or Firm* — Fletcher Yoder PC

(57) ABSTRACT

Systems and method are described for improving electrical isolation between a transmission signal and receiver circuitry of a transceiver communicating over one or more wireless networks via one or more shared antennas. The transceiver may include isolation circuitry to facilitate isolation of the transmission signal from the receiver circuitry. However, a leakage current of the transmission signal and noise signals may appear at the receiver circuitry. Presence of the leakage current or the noise signals in the receiver circuitry may cause interference with the reception signal. As such, the isolation circuitry may benefit from additional isolation between the transmission signal and the receiver circuitry to reduce an effect of the leakage current and the noise signals on the reception signal.

20 Claims, 11 Drawing Sheets

(56) References Cited

U.S. PATENT DOCUMENTS

| | | | |
|---|---|---|---|
| 10,284,356 B2 | 5/2019 | Bharadia et al. | |
| 10,291,384 B2 | 5/2019 | Askar et al. | |
| 2011/0299459 A1* | 12/2011 | Mirzaei | H04B 1/18 370/328 |
| 2012/0033766 A1* | 2/2012 | Hosokawa | H04B 1/10 375/350 |
| 2012/0201153 A1 | 8/2012 | Bharadia et al. | |
| 2014/0348018 A1* | 11/2014 | Bharadia | H04B 1/56 370/278 |
| 2015/0303984 A1 | 10/2015 | Braithwaite | |
| 2017/0019272 A1* | 1/2017 | Brannon | H04L 5/14 |
| 2019/0074862 A1 | 3/2019 | Wang et al. | |
| 2019/0198999 A1* | 6/2019 | Ashrafi | H01Q 25/04 |

OTHER PUBLICATIONS

Office Action for Korean Patent Application No. 10-2022-0103781 dated Nov. 17, 2022; 6 pgs.

* cited by examiner

LEAKAGE AND NOISE CANCELLING FOR DOUBLE BALANCED DUPLEXERS

CROSS REFERENCE TO RELATED APPLICATION

This application is a continuation of U.S. patent application Ser. No. 17/065,397 entitled "LEAKAGE AND NOISE CANCELLING FOR DOUBLE BALANCED DUPLEXERS," filed on Oct. 7, 2020, which is hereby incorporated by reference in its entirety for all purposes.

BACKGROUND

The present disclosure relates generally to wireless communication systems and, more specifically, to isolating receivers from transmission signals in wireless communication devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices are being used more and more every day to transfer data between users, to control smart home devices, stream movies and shows, and so on. As the amount of data being communicated using electronic devices is increasing, maintaining integrity of the communicated data becomes more and more important. For example, in an electronic device, a transmitter and a receiver may be coupled to one or more antennas to enable the electronic device to transmit and receive wireless signals. To increase an amount of data able to be sent and received and decrease a time between sending and receiving the data, the electronic device may enable full duplex operations (e.g., sending data while receiving data) via frequency division duplexing (FDD). That is, transmission signals may be sent via the one or more antennas over a first frequency range while received signals may be received via the one or more antennas over a second frequency range different than the first. To enable these FDD-full duplex operations, the electronic device may include isolation circuitry that isolate transmission signals from the receiver and isolate the received signals from the transmitter.

The transmitter includes a power amplifier that amplifies a transmission signal so that the transmission signal may be provided to the one or more antennas with sufficient transmission power. However, the amplifier may introduce noise to the transmission signals (e.g., in the receive frequency band) that may result in interference and reduced data reliability at the receiver of the electronic device.

Moreover, certain electronic devices may use electrical components (e.g., baluns) that may isolate the transmitter from received signals, and the receiver from transmission signals. However, the electrical components may provide less than ideal isolation between the transmission signal and the receiver due to non-ideal characteristics of real-world electrical components. This less than ideal isolation may lead to leakage of the transmission signal to the receiver, which may cause interference at the receiver.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In some embodiments, the isolation circuitry may extend one or more auxiliary signal paths between the transmission circuitry and the receiver circuitry to reduce an effect of the leakage current and/or the noise signals in reception signal. Such auxiliary signal paths may provide one or more feedback signals from the transmission circuitry to the receiver circuitry to cancel the leakage current and/or the noise signals. The one or more feedback signal may include an adjusted portion of the transmission signal. The auxiliary signal paths may each include phase adjustment circuitry. For example, a first auxiliary signal path may provide the first feedback signal 180 degrees out of phase compared to the transmission signal to cancel the leakage current. In some embodiments, the auxiliary signal paths may also include gain adjustment circuitry. The gain adjustment circuitry may adjust a current or an amplitude of the first feedback signal to reduce or cancel the leakage current.

In different embodiments, the first auxiliary signal path may be connected to the transmitter circuitry before the PA (e.g., an input node of the PA) or after the PA (e.g., an output node of the PA). In the first embodiment, the first auxiliary signal path is connected to the transmitter circuitry before the PA. The first feedback signal may provide an adjusted portion of the transmission signal for cancelling the leakage current at the receiver circuitry. The first auxiliary signal path may include phase adjustment circuitry and/or gain adjustment circuitry to provide the adjusted portion of the transmission signal for cancelling the leakage current.

In a second embodiment, the first auxiliary signal path is connected to the transmitter circuitry after the PA. The first feedback signal may provide the adjusted portion of the transmission signal with the noise signals (e.g., generated by the PA) for cancelling the leakage current at the receiver circuitry. The first auxiliary signal path may include phase adjustment circuitry and/or gain adjustment circuitry to provide the adjusted portion of the transmission signal for cancelling the leakage current. Moreover, in the second embodiment, the first auxiliary signal path may include a bandpass filter to prevent the noise signals from distorting the first feedback signal. That is, the bandpass filter may allow a portion of the first feedback signal that is within the transmission frequency band to cancel the leakage current and prevent a portion of the first feedback signal that is outside the transmission frequency band from the receiver circuitry.

In a third embodiment, the isolation circuitry may extend a second auxiliary signal path between the transmission circuitry and the receiver circuitry to reduce or cancel the noise signals. The second auxiliary signal path may provide a second feedback signal from the transmission circuitry to the receiver circuitry to cancel the noise signals of the transmission signal within the reception frequency band. The second feedback signal may include a different adjusted portion of the transmission signal to cancel the noise signals at the receiver circuitry. The second auxiliary signal path may include phase adjustment circuitry and/or gain adjustment circuitry to provide the adjusted portion of the transmission signal for cancelling the noise signals at the receiver circuitry.

In one embodiment, a radio frequency transceiver circuitry may include a first balun and a second balun. The first balun and the second balun may be electrically coupled to one or more antennas. The radio frequency transceiver circuitry may also include transmit circuitry electrically coupled to the first balun. The transmit circuitry may send a transmission signal via the one or more antennas. The radio frequency transceiver circuitry may include receiver circuitry. The receiver circuitry may electrically couple to the second balun. Moreover, the receiver circuitry may receive a receive signal using the one or more antennas. The radio frequency transceiver circuitry may also include phase adjustment circuitry. The phase adjustment circuitry may electrically couple between the transmit circuitry and the second balun. The phase adjustment circuitry may adjust a phase of a feedback signal. Moreover, the phase adjustment circuitry may provide the feedback signal from the transmit circuitry to the second balun to compensate for a leakage or noise signal generated by the transmit circuitry when sending the transmission signal via the one or more antennas.

In another embodiment, an electronic device may include one or more antennas. The electronic device may also include transmission circuitry to send a transmission signal to the one or more antennas. The receiver circuitry configured to receive a reception signal from the one or more antennas. The electronic device may also include isolation circuitry to provide electrical isolation between the transmission signal and the receiver circuitry. Moreover, the isolation circuitry may provide electrical isolation between the reception signal and the transmission circuitry. The electronic device may also include a feedback path between the transmission circuitry and the receiver circuitry. The feedback path may provide a feedback signal from the transmission circuitry to the receiver circuitry. The electronic device may also include a phase adjustment circuitry disposed on the feedback path. The phase adjustment circuitry may adjust a phase of the feedback signal to compensate for a leakage or noise signal generated by the transmission circuitry when sending the transmission signal to the one or more antennas.

In yet another embodiment, an electronic device may include antenna means, means for transmitting a transmission signal via the antenna means, means for receiving a receive signal via the antenna means, and means for isolating the receiving means from the transmission signal. The isolating means may include means for providing a feedback signal from the transmitting means to the receiving means. Moreover, the isolating means may include means for adjusting a phase of the feedback signal to compensate for a leakage or noise signal generated by the transmitting means when transmitting a transmission signal via the antenna means.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

Figure 1:
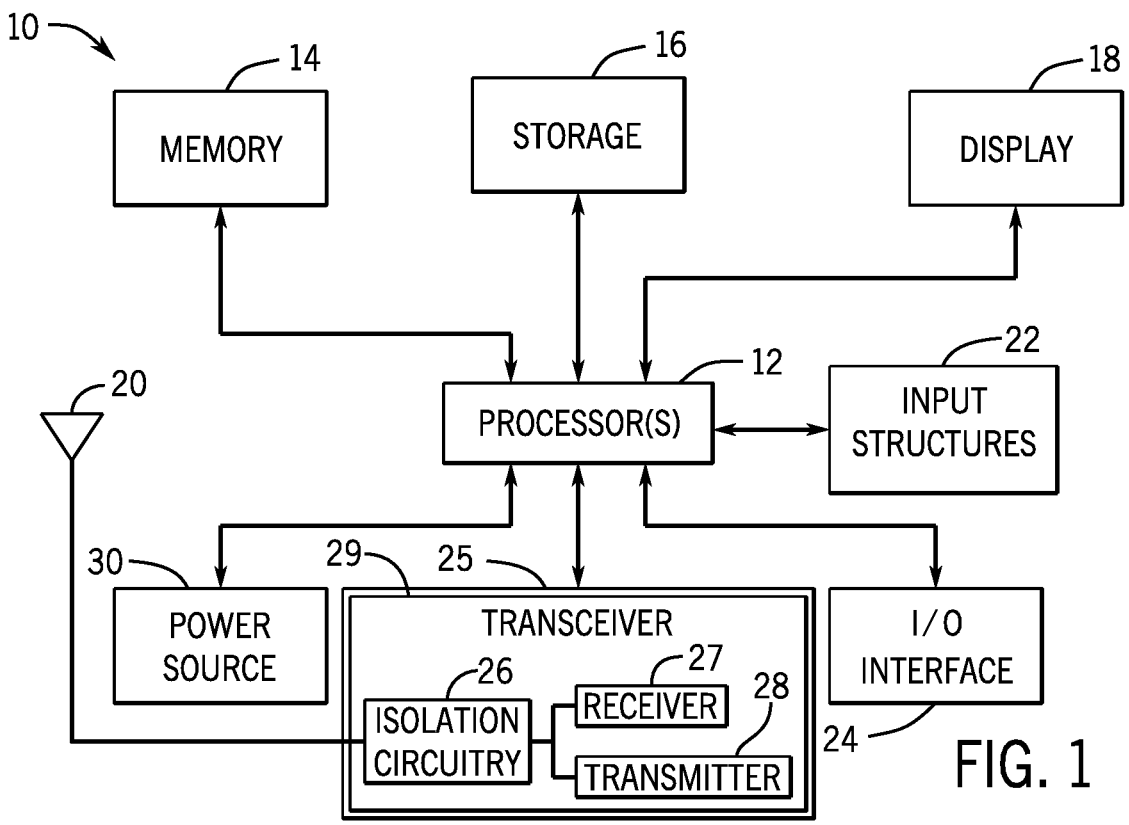
FIG. 1 is a block diagram of an electronic device, according to an embodiment of the present disclosure.

With the foregoing in mind, there are many suitable communication devices that may include and use transceiver circuitry that reduces or compensates for leakage or noise signals from transmitter circuitry to receiver circuitry, as described herein. Turning first to FIG. 1, an electronic device 10 according to an embodiment of the present disclosure may include, among other things, a processor core complex 12 including one or more processor(s), memory 14, nonvolatile storage 16, a display 18, input structures 22, an input/output (I/O) interface 24, a network interface 25, and a power source 30. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
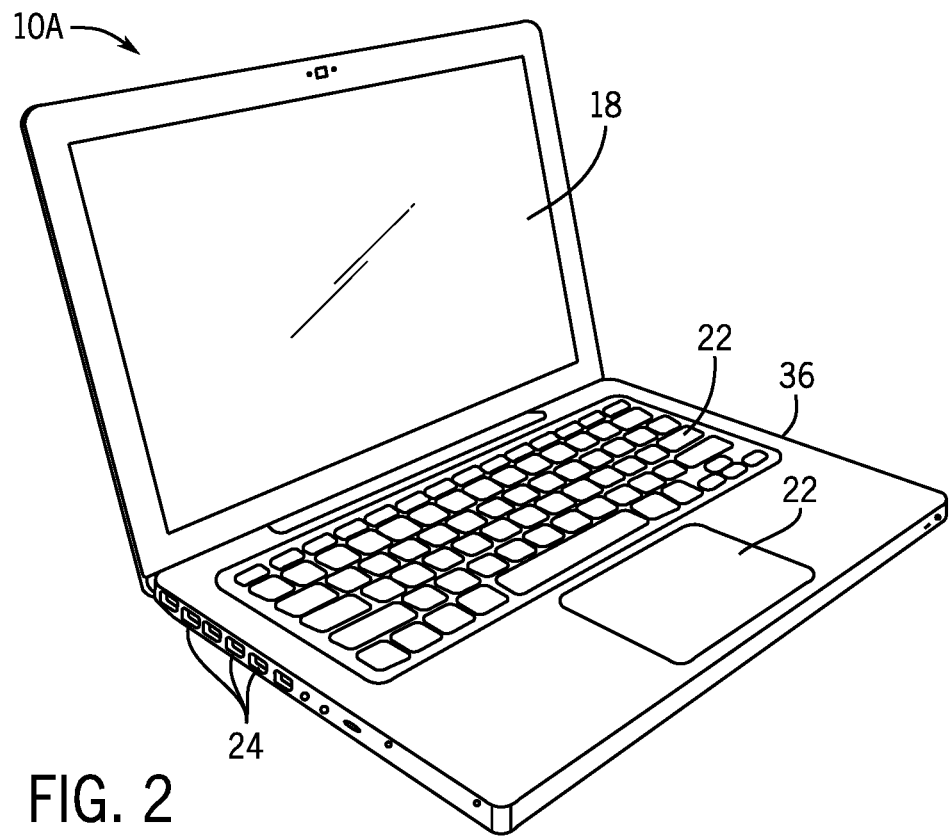
FIG. 2 is a perspective view of a notebook computer representing an embodiment of the electronic device of FIG. 1.
Figure 4:
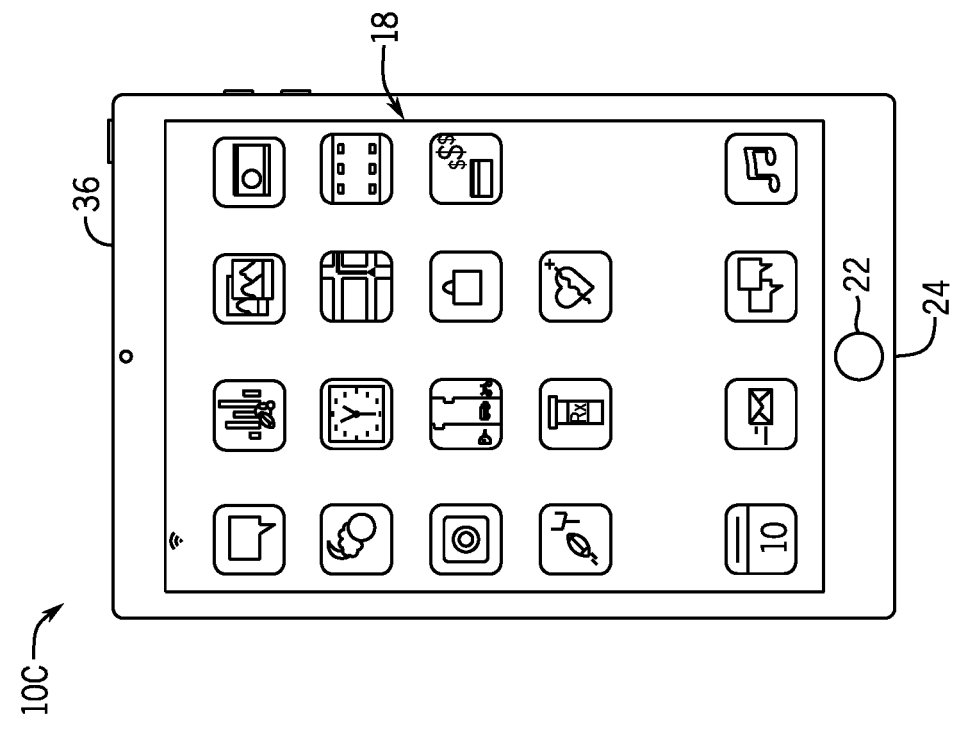
FIG. 4 is a front view of another handheld device representing another embodiment of the electronic device of FIG. 1.
Figure 3:
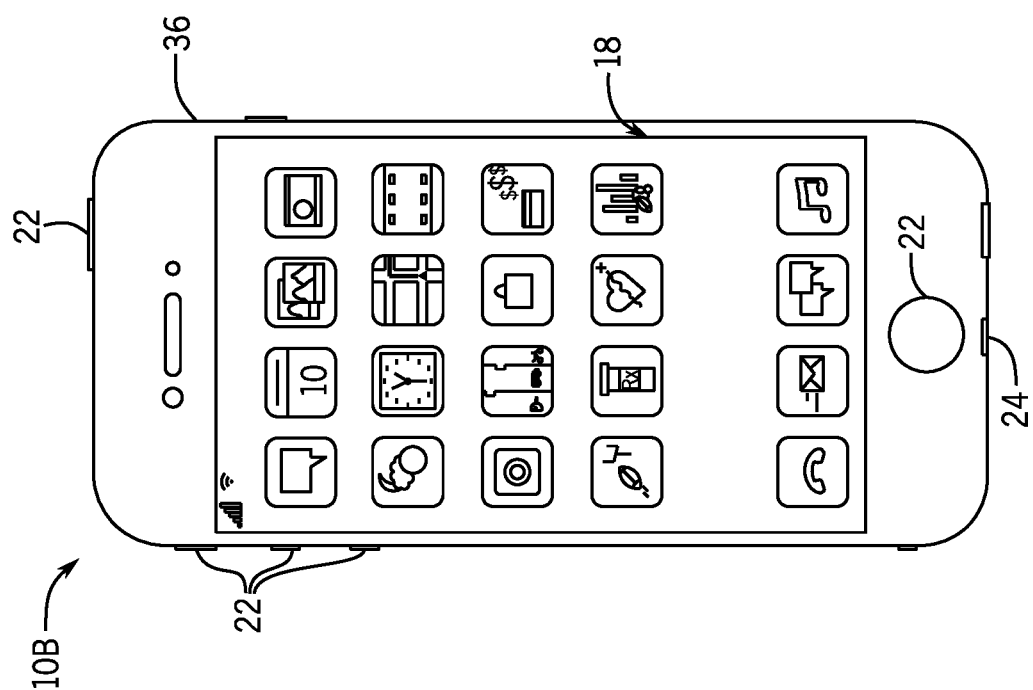
FIG. 3 is a front view of a handheld device representing another embodiment of the electronic device of FIG. 1.
Figure 5:
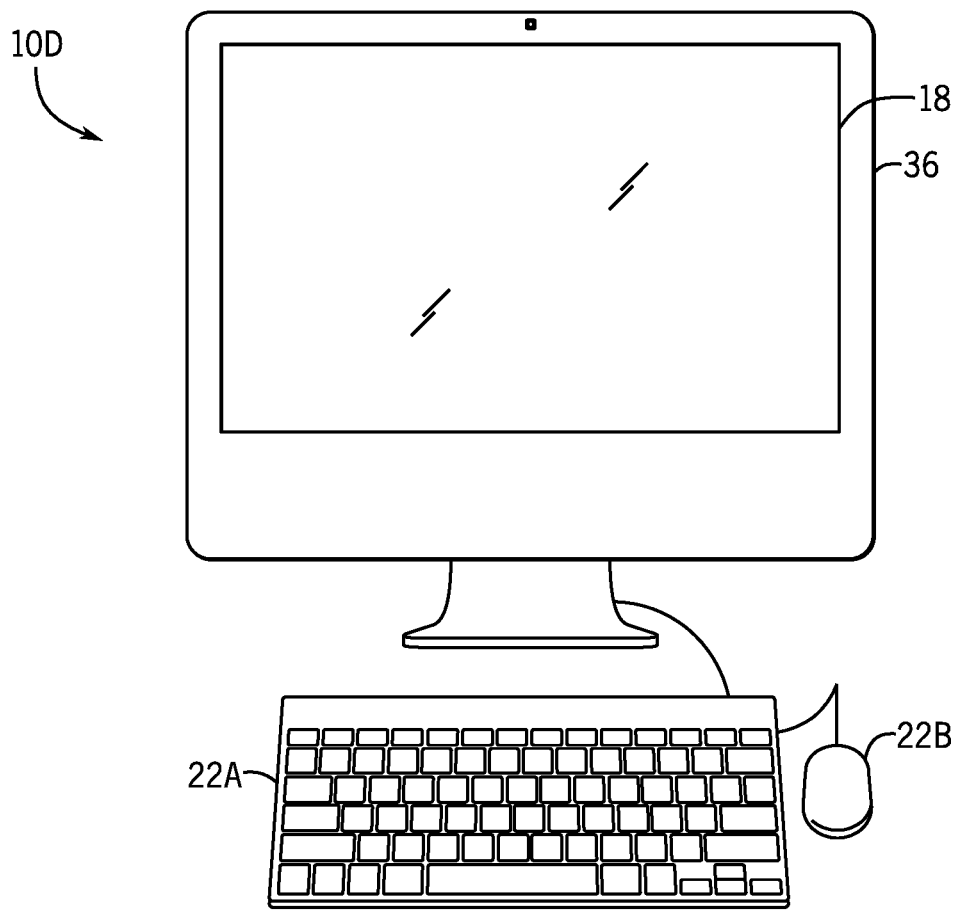
FIG. 5 is a front view of a desktop computer representing another embodiment of the electronic device of FIG. 1.
Figure 6:
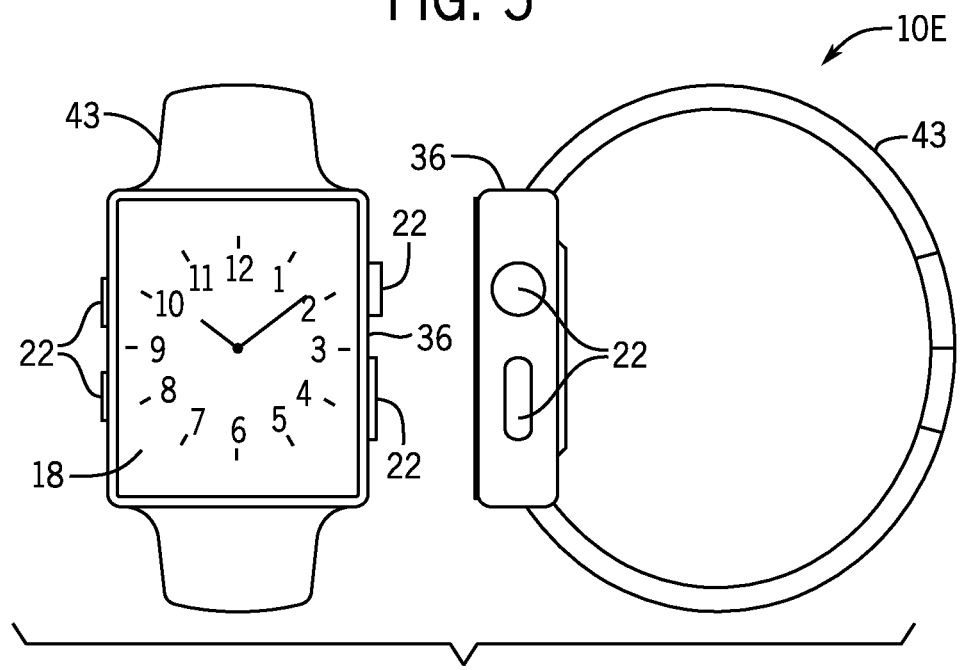
FIG. 6 is a perspective view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, software, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with a memory 14 and a nonvolatile storage 16 to perform various algorithms. Such programs or instructions executed by the processor(s) 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 25. The network interface 25 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network. In particular, the network interface 25 may include, for example, one or more interfaces for using a Release-15 cellular communication standard of the 5G specifications that include the millimeter wave (mmWave) frequency range (e.g., 24.25-300 gigahertz (GHz)). The network interface 25 of the electronic device 10 may allow communication over the aforementioned networks (e.g., 5G, Wi-Fi, LTE-LAA, and so forth).

The network interface 25 may also include one or more interfaces, for example, for broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. In some embodiments, network interfaces 25 may be capable of joining multiple networks, and may employ one or more antennas 20 to that end.

In some examples, the network interface 25 may include a transceiver circuitry 29, among other things. The transceiver circuitry 29 may facilitate communication via the one or more antennas 20 to enable the electronic device 10 to transmit and receive wireless signals. The transceiver circuitry 29 may include isolation circuitry 26, a receiver 27, and a transmitter 28. The isolation circuitry 26 may enable bidirectional communication over a shared signal path while separating signals traveling in each direction from one another. In particular, the isolation circuitry 26 may isolate the transmitter 28 from a received signal and/or isolate the receiver 27 from a transmission signal (e.g., isolate the transmitter from the receiver, and vice versa) to enable bidirectional communication.

In some embodiments, the isolation circuitry 26 may include one or more duplexers (e.g., a double balance duplexer (DBD)) that isolates the transmitter 28 from a received signal and/or isolates the receiver 27 from a transmission signal. In different embodiments, the isolation circuitry 26 may use different electrical components (e.g., balance-unbalance transformers or baluns) for providing the described isolation. However, one or more components of the isolation circuitry 26 may include non-ideal electrical characteristics. Such non-ideal characteristics of components associated with the network interface 25 may disturb the duplex function and degrade isolation between the transmitter 28 and the receiver 27. To prevent such disruption, additional circuitry may be used to reduce the effect of components with non-ideal characteristics in the receiver 27.

In some embodiments, the network interface 25 may transmit and receive RF signals to support voice and/or data communication in wireless applications such as, for example, PAN networks (e.g., BLUETOOTH®), WLAN networks (e.g., 802.11x WI-FI®), WAN networks (e.g., 3G, 4G, 5G, NR, and LTE® and LTE-LAA cellular networks), WIMAX® networks, mobile WIMAX® networks, ADSL and VDSL networks, DVB-T® and DVB-H® networks, UWB networks, and so forth. As further illustrated, the electronic device 10 may include the power source 30. The power source 30 of the electronic device 10 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers), or generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif.

By way of example, the electronic device 10, taking the form of a notebook computer 10A, is illustrated in FIG. 2 in accordance with one embodiment of the present disclosure. The depicted notebook computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) and/or applications running on computer 10A. For example, a keyboard and/or touchpad may allow a user to navigate a user interface and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and/or to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc. of Cupertino, Calif., a universal serial bus (USB), or other similar connector and protocol.

The input structures 22, in combination with the display 18, may allow a user to control the handheld device 10B. For example, the input structures 22 may activate or deactivate the handheld device 10B, navigate the user interface to a home screen, a user-configurable application screen, and/or activate a voice-recognition feature of the handheld device 10B . Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or another similar device by Apple Inc. of Cupertino, Calif. It should be noted that the computer 10D may also represent a personal computer (PC) by another manufacturer. A similar enclosure 36 may be provided to protect and enclose internal components of the computer 10D, such as the display 18. In certain embodiments, a user of the computer 10D may interact with the computer 10D using various peripheral input structures 22, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may operate using the techniques described herein. By way of example, the wearable electronic device 10E, which may include a wristband 43, may be an Apple Watch® by Apple Inc. of Cupertino, Calif. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, LED display, OLED display, active-matrix organic light emitting diode (AMOLED) display, and so forth), as well as input structures 22, which may allow users to interact with a user interface of the wearable electronic device 10E.

Figure 7:
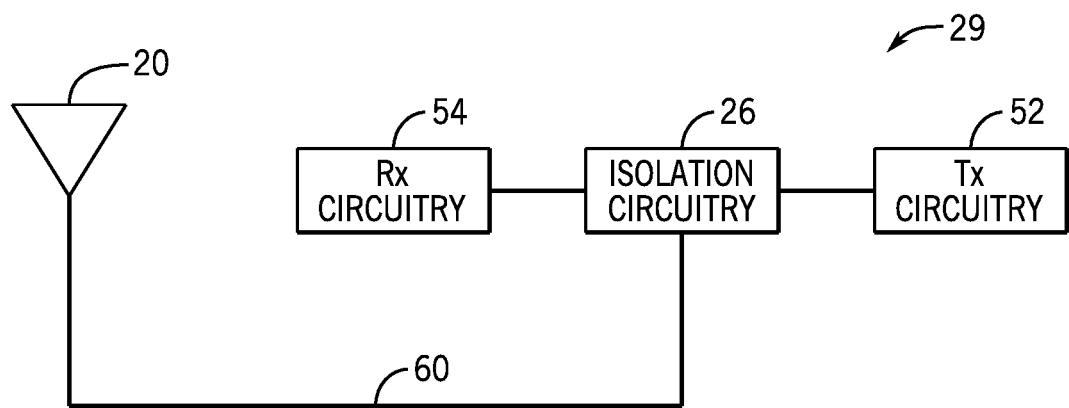
FIG. 7 is a block diagram of example transceiver circuitry of the electronic device of FIG. 1, according to an embodiment of the present disclosure.

With the foregoing in mind, FIG. 7 is a block diagram of example transceiver circuitry 29, according to an embodiment of the present disclosure. The transceiver circuitry 29 may include the isolation circuitry 26 communicatively coupled to and/or disposed between transmit (TX) circuitry 52 and receiver (RX) circuitry 54. In some embodiments, the isolation circuitry 26 may enable FDD. That is, the isolation circuitry 26 may allow a transmission signal (TX signal) of a first frequency band to pass through from the TX circuitry 52 (e.g., via a transformer effect) to the one or more antennas 20 while blocking signals within the first frequency band from passing through to the RX circuitry 54. Moreover, the isolation circuitry 26 may allow a reception signal (RX signal) of a second frequency band to pass through from the antennas 20 to the RX circuitry 54 (e.g., via circuit paths) while blocking signals within the second frequency band from passing through to the TX circuitry 52.

Each frequency band may be of any suitable bandwidth, such as between 1 megahertz (MHz) and 100 gigahertz (GHz) (e.g., 10 MHz), and include any suitable frequencies. For example, the first frequency band (e.g., the TX frequency band) may be between 880 and 890 MHz, and the second frequency band (e.g., the RX frequency band) may be between 925 and 936 MHz.

A shared path 60 may couple the isolation circuitry 26 to the one or more antennas 20. The shared path 60 may be bidirectional and may enable communication of the TX signal from the TX circuitry 52 to the one or more antennas 20, and/or the RX signal from the one or more antennas 20 to the RX circuitry 54.

Figure 8A:
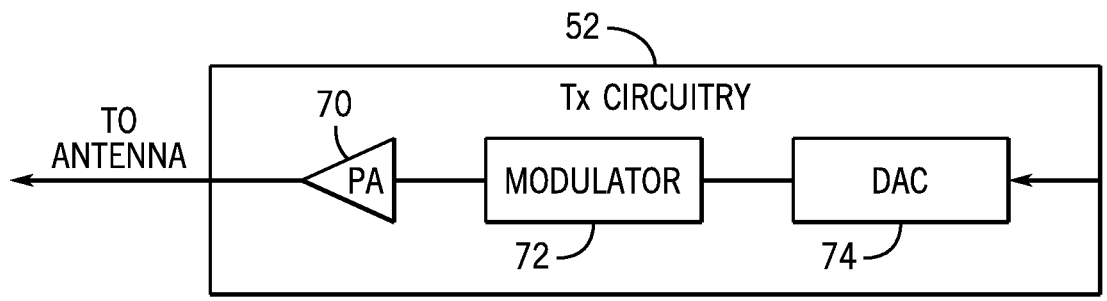
FIG. 8A is a block diagram of receiver circuitry of the example transceiver circuitry of FIG. 7, according to an embodiment of the present disclosure.

FIG. 8A is a schematic diagram of the TX circuitry 52, according to an embodiment of the present disclosure. As illustrated, the TX circuitry 52 may include, for example, a power amplifier (PA) 70, a modulator 72, and a digital-to-analog converter (DAC) 74. In some embodiments, the TX circuitry 52 may include additional or alternative components. Nevertheless, a digital signal containing information to be transmitted via the one or more antennas 20 may be provided to the DAC 74. The DAC 74 may convert the received digital signal to an analog signal. The modulator 72 may combine the converted analog signal with a carrier signal to generate a radio wave.

The PA 70 may receive the modulated signal from the modulator 72. The PA 70 may then amplify the modulated signal to a suitable level to drive transmission of the signal via the one or more antennas 20 (e.g., the TX signal). In some embodiments, the PA 70 may output the amplified TX signal with noise signals distorted over a wider or different range of frequency compared to the TX frequency band (e.g., within the RX frequency band). In some embodiments, the PA-generated noise signals may traverse the isolation circuitry 26 to the RX circuitry 54 and may degrade a signal integrity of the RX signal. For example, the PA-generated noise signals may distort the RX signal within the RX circuitry 54. In additional or alternative embodiments, the TX signal may include noise signals (e.g., within the RX frequency band) generated by other electrical components associated with different circuitry that may traverse the isolation circuitry 26 to the RX circuitry 54 and may degrade the signal integrity of the RX signal.

Figure 8B:
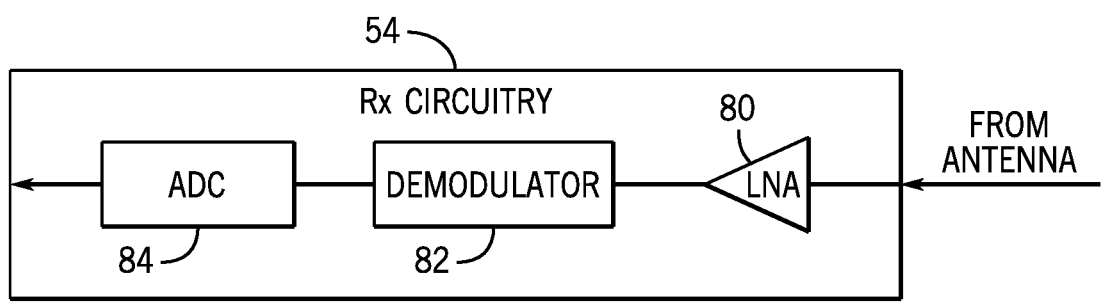
FIG. 8B is a block diagram of transmitter circuitry of the example transceiver circuitry of FIG. 7, according to an embodiment of the present disclosure.

FIG. 8B is a schematic diagram of the RX circuitry 54, according to an embodiment of the present disclosure. As illustrated, the RX circuitry 54 may include, for example, a low noise amplifier (LNA) 80, a demodulator 82, and an analog-to-digital converter (ADC) 84. One or more signals received by the one or more antennas 20 may be sent to the RX circuitry 54 via the isolation circuitry 26. In some embodiments, the RX circuitry 54 may include additional or alternative components.

The LNA 80 may receive the RX signal received by the one or more antennas 20 via the isolation circuitry 26. Subsequently, the RX signal is sent to the demodulator 82. The demodulator 82 may remove the RF envelope and extract a demodulated signal from the RX signal for processing. The ADC 84 receives the demodulated analog signal and converts the signal to a digital signal so that it can be further processed by the electronic device 10.

In some cases, the LNA 80 may also receive other signals (e.g., noise signals, PA-generated noise signals, etc.) through the isolation circuitry 26. The LNA 80 may additionally or alternatively receive a leakage signal or current associated with the TX circuitry 52 sending the TX signal (e.g., a portion of the TX signal that leaks from the one or more antennas 20). The LNA 80 may amplify the RX signal to a suitable level for the rest of the circuitry to process. However, the LNA 80 may also amplify the other received signals (e.g., noise signals, PA-generated noise signals, etc.). As such, the demodulator 82 may receive the amplified RX signal with amplified noise and/or leakage signals, which may interfere with the RX signal and result in reduced signal integrity. Embodiments are described below that reduce and/or compensate for the noise and/or leakage signals generated by the TX circuitry 52 and arriving at the RX circuitry 54 to prevent disruption of RX signals. Specifically, a noise canceller signal and/or leakage canceller signal may be generated at the TX circuitry 52 and provided via one or more feedback paths to the RX circuitry 54.

Figure 9:
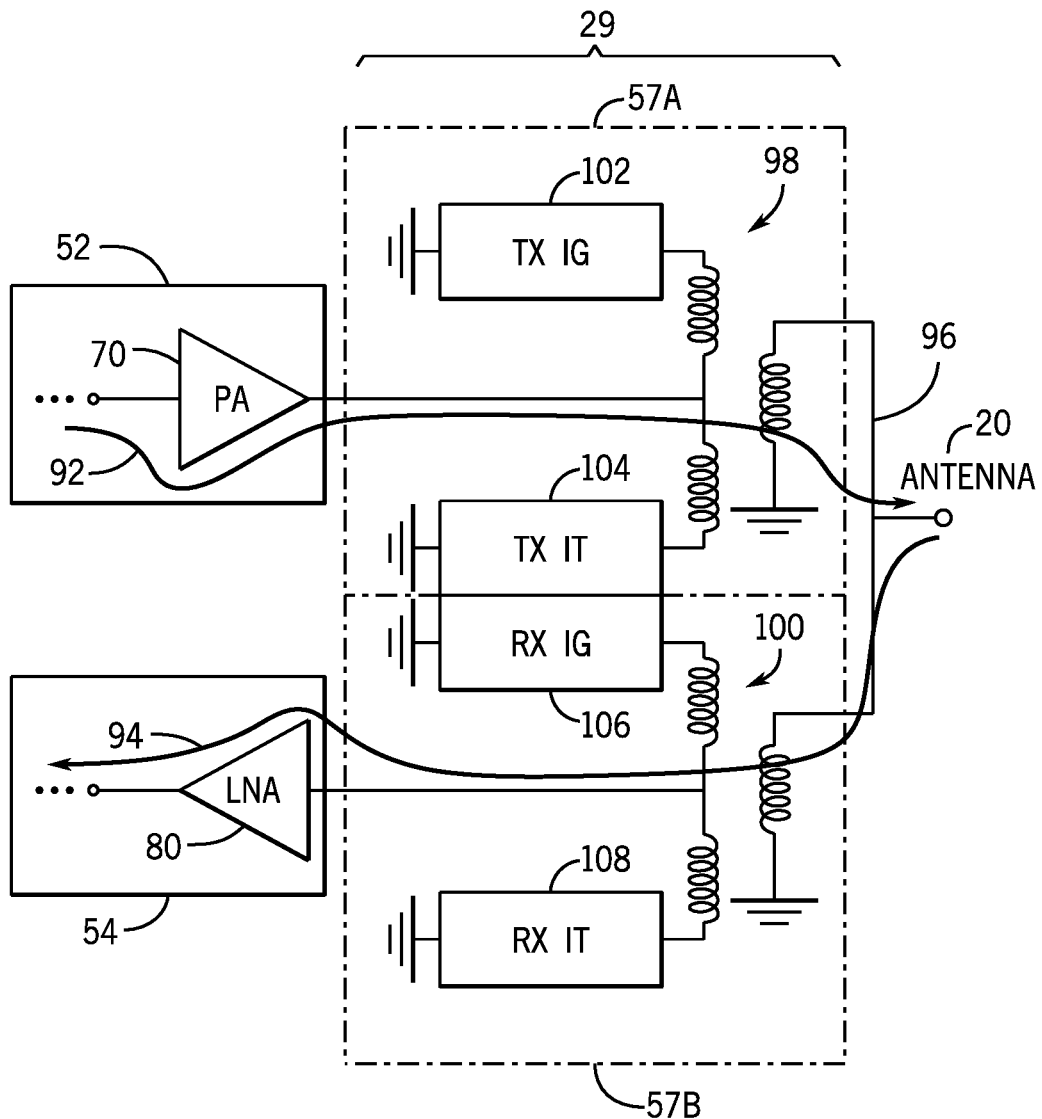
FIG. 9 is a schematic diagram of the example transceiver circuitry of FIG. 7, according to an embodiment of the present disclosure.

With the foregoing in mind, FIG. 9 is a schematic diagram of at least a portion of example transceiver circuitry 29 associated with FIG. 7, according to an embodiment of the present disclosure. Specifically, FIG. 9 depicts a TX signal 92 generated and sent from the TX circuitry 52, through a duplexer 57A of the isolation circuitry 26, to the one or more antennas 20 for transmission. Moreover, the RX circuitry 54 may receive an RX signal 94 via the one or more antennas 20 through a duplexer 57B of the isolation circuitry 26 to reach the RX circuitry 54 for reception. The isolation circuitry 26, including the two duplexers 57A and 57B, may be referred to as an electrical balanced duplexer (EBD). The duplexer 57B may block the TX signal 92 from the RX circuitry 54. Moreover, the duplexer 57A may block the RX signal 94 from the TX circuitry 52. As such, the duplexer 57A and the duplexer 57B may facilitate bidirectional communication of the TX signal 92 and the RX signal 94 over a shared path 96 using FDD techniques. It should be appreciated that FIG. 9 depicts an example embodiment of the isolation circuitry 26, and different circuitry, electrical components, and/or techniques may be used in other embodiments to provide isolation between the TX signal 92 and the RX circuitry 54 and/or the RX signal 94 and the TX circuitry 52.

The duplexer 57A may include tunable impedance components, such as a transmitter impedance gradient (TX IG) 102 and a transmitter impedance tuner (TX IT) 104, to facilitate transmission of the TX signal 92 while providing electrical isolation from signals outside the TX frequency band. In specific embodiments, the TX IG 102 and the TX IT 104 may provide unbalanced and unmatched impedance with respect to signals within the TX frequency band to enable such signals to pass through. For example, the TX IG 102 may provide a low impedance and the TX IT 104 may provide a high impedance. This unbalanced impedance state may enable the TX signals (e.g., the TX signal 92) to travel from the TX circuitry 52 across the first balun 98 to the shared path 96. Moreover, the TX IG 102 and the TX IT 104 may provide balanced and matched impedance with respect to signals outside the TX frequency band to prevent such signals from passing through. For example, the TX IG 102 and the TX IT 104 may both provide a high impedance with respect to signals outside the TX frequency band. As such, this balanced impedance state may prevent signals outside the TX frequency band (e.g., within the RX frequency band)

from traveling from the first balun 98 to the TX circuitry 52. It should be understood that the TX IG 102 and the TX IT 104 are provided as examples, and any suitable tunable impedance components may be used.

Similarly, the duplexer 57B may provide electrical isolation for signals outside the RX frequency band. That is, the duplexer 57B may enable the RX signal 94, within the RX frequency band, to pass through a second balun 100 from the shared path 96 (e.g., received via the one or more antennas 20) to the RX circuitry 54 (e.g., input to the LNA 80). Moreover, the duplexer 57B may prevent signals (e.g., currents) outside the RX frequency band from traversing the second balun 100, thus, isolating the RX circuitry 54 from the TX signal 92 and noise signals, among other things.

In particular, the second portion of the duplexer 57B may include a receiver impedance gradient (RX IG) 106 and a receiver impedance tuner (RX IT) 108 to facilitate reception of the RX signal 94 while providing electrical isolation against signals outside the RX frequency band. In specific embodiments, the RX IG 106 and the RX IT 108 may provide unbalanced and unmatched impedance with respect to signals within the RX frequency band to enable such signals to pass through. For example, with respect to signals within the RX frequency band, the RX IG 106 may provide a low impedance to a first side of the second balun 100 and the RX IT 108 may provide a high impedance to a second side of the second balun 100. This unbalanced impedance state may enable the RX signals (e.g., the RX signal 94) to travel from the one or more antennas 20 across the second balun 100 to the RX circuitry 54. Additionally, the RX IG 106 and the RX IT 108 may provide balanced and matched impedance with respect to signals outside the RX frequency band (e.g., within the TX frequency band). For example, with respect to signals outside the RX frequency band, the RX IG 106 and the RX IT 108 may both provide a high impedance with respect to signals outside the RX frequency band. This balanced impedance state may prevent signals outside the RX frequency band from traveling from the second balun 100 to the RX circuitry 54. It should be understood that the RX IG 106 and the RX IT 108 are provided as examples, and any suitable tunable impedance components may be used.

However, the electrical isolation between the TX signal 92 and the RX circuitry 54 may benefit from additional electrical isolation. In particular, because the isolation provided by the duplexers 57A and 57B may be non-ideal (e.g., limited in real-world conditions or when implemented) when transmitting the TX signal 92, a portion of the TX signal (e.g., a leakage current or signal) may leak to the RX circuitry 54. That is, the RX IG 106 and/or the RX IT 108 may include less than ideal electrical characteristics. Hence, the RX IG 106 and the RX IT 108 may experience at least some or partially unbalanced (e.g., and/or unmatched) impedances, which may cause leakage of some electrical current associated with the TX signal 92 to the RX circuitry 54. Moreover, the second portion of the duplexer 57B is susceptible to noise signals within the RX frequency band. For example, the PA 70, when amplifying the TX signal for transmission with sufficient electrical power, may introduce noise signals (e.g., including in the RX frequency range) to the TX signal 92 that may traverse the first balun 98 and the second balun 100 and cause interference with the RX signal 94. To reduce or cancel the leakage and/or noise signals, a noise canceller signal and/or leakage canceller signal may be generated at the TX circuitry 52 and provided via one or more feedback paths to the RX circuitry 54, as discussed in more detail below. This may result in additional or better isolation for the RX circuitry 54 from the TX signal 92.

Figure 10:
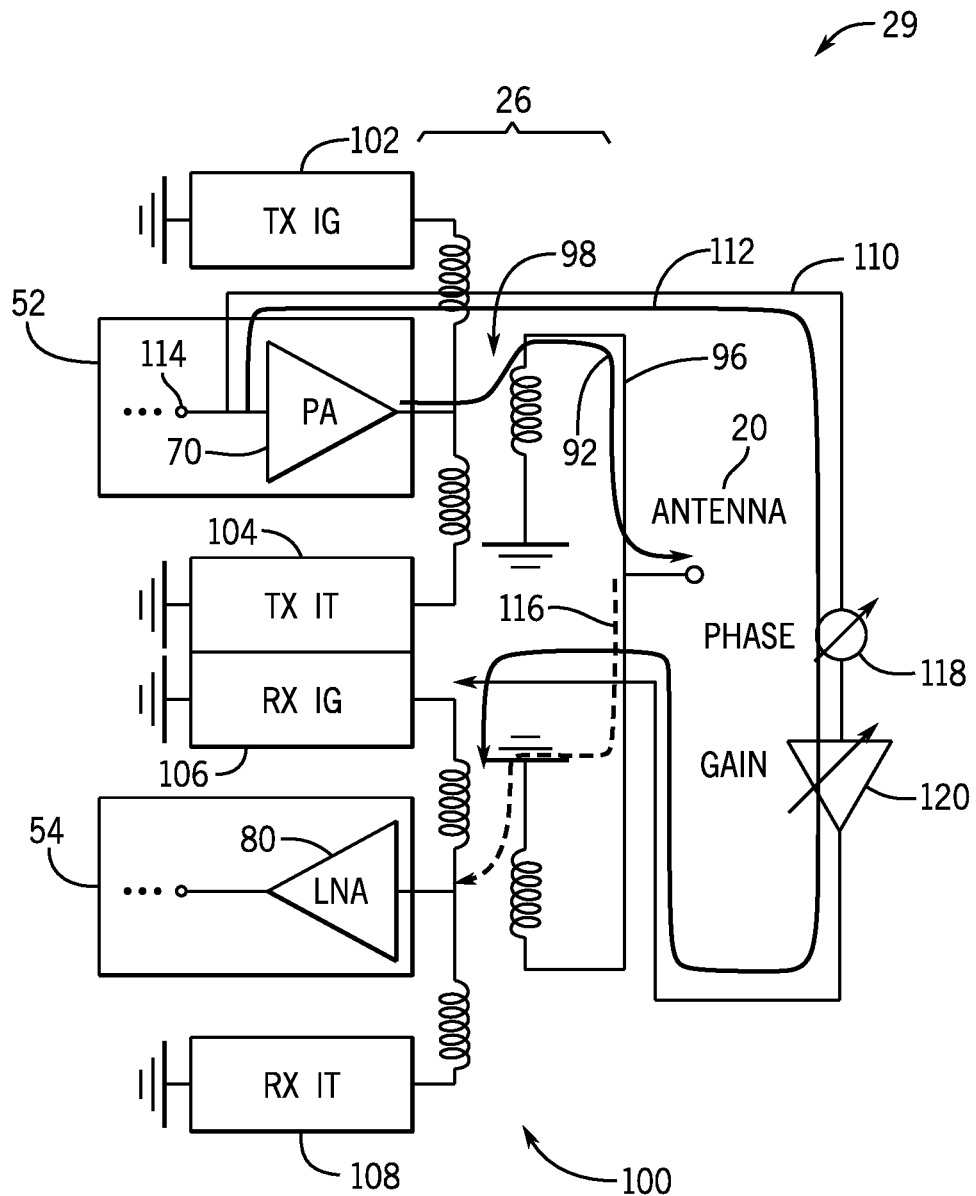
FIG. 10 is a schematic diagram of an embodiment of the transceiver circuitry of FIG. 9 having a feedback path that reduces or compensates for a leakage signal from the transmitter circuitry to the receiver circuitry.

FIG. 10 is a schematic diagram of a first embodiment of the transceiver circuitry 29 of FIG. 9 including a feedback path 110 electrically coupled to an input of the PA 70 that provides a leakage canceller signal 112 (e.g., a feedback signal) to cancel or reduce a leakage signal 116 of the TX signal 92. In particular, the TX circuitry 52 may generate and send the TX signal 92 within the TX frequency band to be transmitted using the one or more antennas 20. The PA 70 may amplify the TX signal 92 and the TX signal 92 may pass through the first balun 98 and the shared signal path 96 for transmission via the antennas 20.

The second balun 100 may prevent the TX signal 92 to pass through to the RX circuitry 54 from the shared signal path 96. However, due to real-world variations in electrical characteristics of different electrical components, such as the second balun 100, the RX IG 106, and/or the RX IT 108, a portion of the TX signal 92 (e.g., a leakage current or signal 116) may leak from the shared signal path 96 to the second balun 100. If not accounted for, the leakage signal 116 may cause sensitivity degradation at the RX circuitry 54 and/or interfere with an RX signal 94 received at the RX circuitry 54.

As mentioned above, the feedback path 110 may provide the leakage canceller signal 112 to reduce or cancel the leakage signal 116. The feedback path 110 may be electrically coupled to an input of the PA 70 at a node 114 (e.g., between the modulator 72 and the PA 70) to provide the leakage canceller signal 112. As such, the transceiver circuitry 29 may include circuitry on the feedback path 110 to facilitate cancelling the leakage signal 116

In some embodiments, the feedback path 110 may include phase adjustment circuitry 118 and gain adjustment circuitry 120 to facilitate cancelling the leakage signal 116. The phase adjustment circuitry 118 may adjust a phase of the leakage canceller signal 112. For example, the feedback path 110 may use the phase adjustment circuitry to provide the leakage canceller signal 112, 180 degrees out of phase compared to the TX signal 92 to cancel the leakage signal 116. In some embodiments, the transceiver circuitry 29 may include phase sensing circuitry to determine the phase of the TX signal 92, so that the phase adjustment circuitry 118 may better tune the phase of the leakage canceller signal 112 to be 180 degrees out of phase compared to the TX signal 92.

Moreover, the gain adjustment circuitry 120 may adjust an amplitude of the leakage canceller signal 112 to correlate to or match the amplitude of the leakage signal 116 to reduce or cancel the leakage signal 116. In some embodiments, the transceiver circuitry 29 may include gain or amplitude sensing circuitry to determine the amplitude of the leakage signal 116, so that the gain adjustment circuitry 120 may better tune the amplitude of the leakage canceller signal 112 to correlate to or match the amplitude of the leakage signal 116. As such, the feedback path 110 may provide the leakage canceller signal 112 to the RX circuitry 54 to reduce or compensate for an effect of the leakage signal 116 on RX signals.

Figure 11:
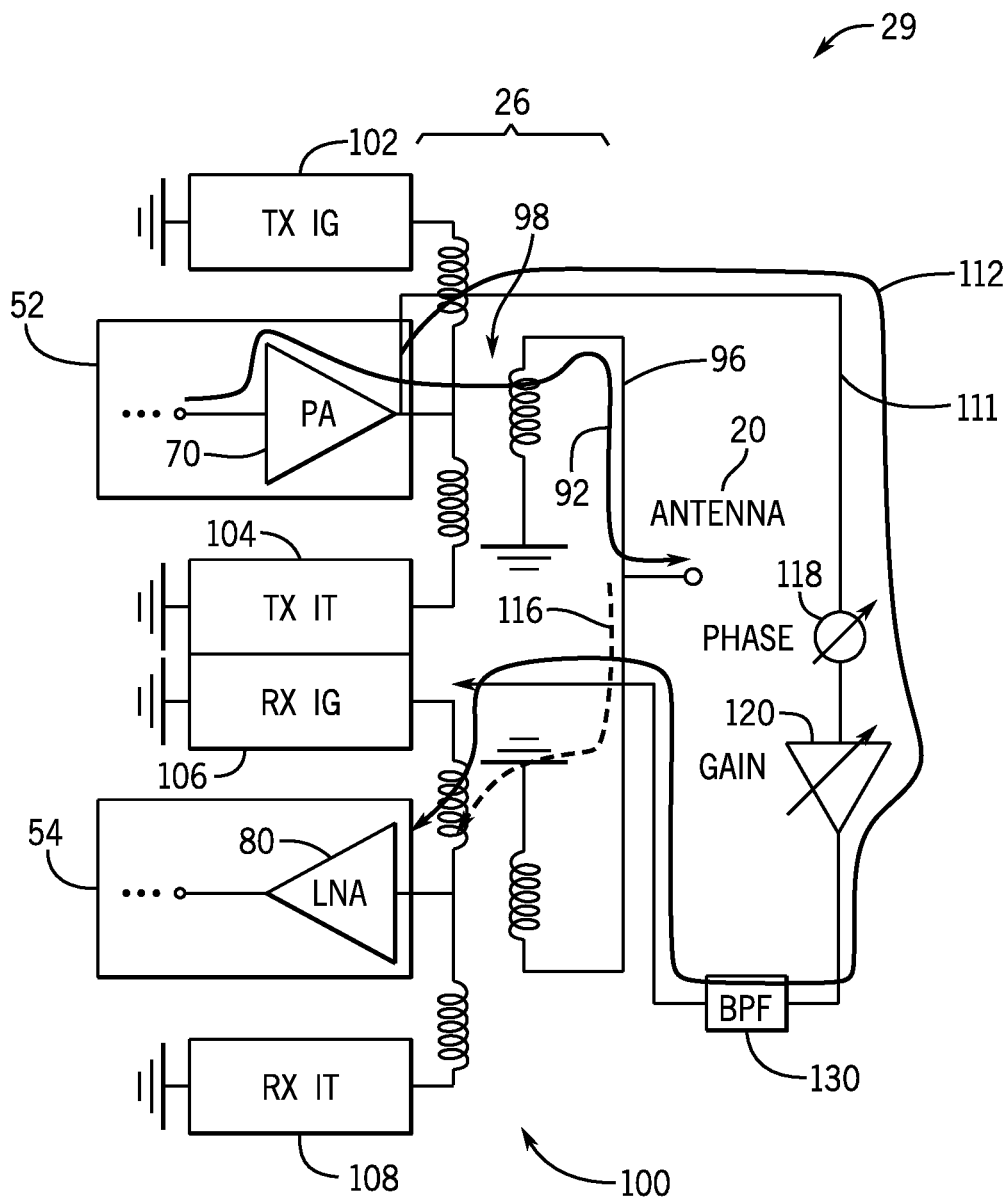
FIG. 11 is a schematic diagram of an embodiment of the transceiver circuitry of FIG. 9 having a feedback path that reduces or compensates for a leakage signal from the transmitter circuitry to the receiver circuitry, where the leakage signal includes noise signals.

FIG. 11 is a schematic diagram of a second embodiment of the transceiver circuitry 29 of FIG. 9 including a feedback path 111 electrically coupled to an output of the PA 70. The feedback path 111 may provide the leakage canceller signal 112 (e.g., a leakage canceller signal) to cancel or reduce the leakage signal 116 from the TX signal 92. As previously discussed, the PA 70 may amplify the TX signal 92 and the amplified TX signal 92 may pass through the first balun 98 and the shared signal path 96 for transmission via the one or more antennas 20. Because the feedback path 111 is coupled to the output of the PA 70, the leakage canceller signal 112 may include noise (e.g., outside of the TX frequency band, such as within the RX frequency band) generated by the PA 70. As such, the transceiver circuitry 29 may include circuitry on the feedback path 111 to filter such noise from the leakage canceller signal 112, such that the leakage canceller signal 112 may better correlate to and compensate for the TX signal 92.

As illustrated, the feedback path 111 includes, in addition to the phase adjustment circuitry 118 and the gain adjustment circuitry 120, a band pass filter (BPF) 130. The BPF 130 may enable TX frequency band signals to pass through, and block signals outside of the TX frequency band from passing through. As such, the BPF 130 may facilitate cancelling the leakage signal 116 at the RX circuitry 54. As with the transceiver circuitry 29 described in FIG. 10, the phase adjustment circuitry 118 may adjust a phase of the leakage canceller signal 112 to correlate to (e.g., 180 degree out of phase compared to) a phase of the leakage signal 116. Moreover, gain adjustment circuitry 120 may adjust an amplitude of the leakage canceller signal 112 to correlate to or match the amplitude of the leakage signal 116. As such, the feedback path 111 may provide the leakage canceller signal 112 to the RX circuitry 54 to reduce an effect of the leakage signal 116. It should be understood that because the transceiver circuitry 29 of FIG. 10 couples the feedback path 110 to an input of the PA 70 (rather than an output of the PA 70), the noise generated by the PA 70 may not be included in the leakage canceller signal 112, and, as such, the BPF 130 may be unnecessary in that embodiment.

Figure 12:
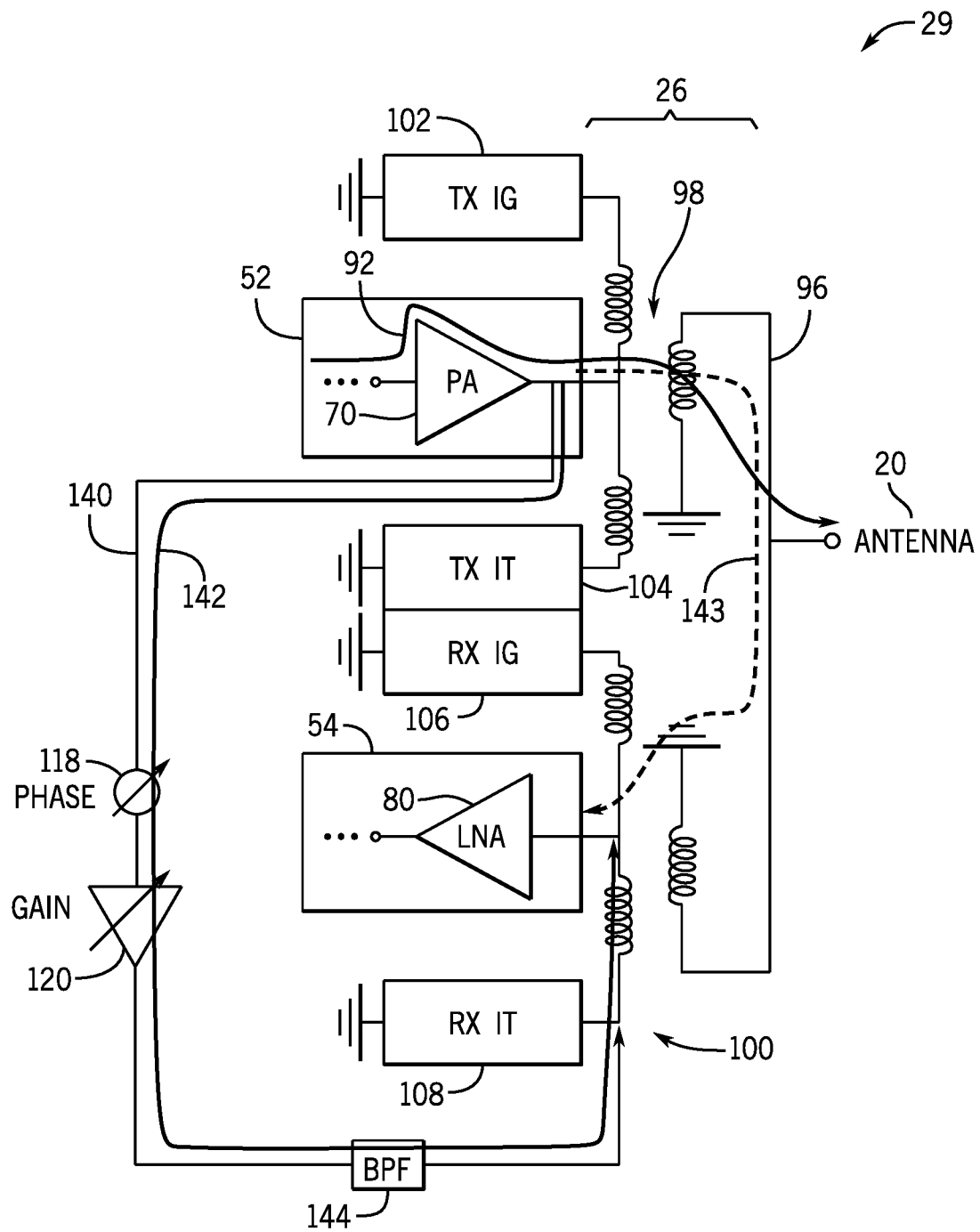
FIG. 12 is a schematic diagram of an embodiment of the transceiver circuitry of FIG. 9 having a feedback path that reduces or compensates for noise signals generated by the transmitter circuitry at the receiver circuitry.

FIG. 12 is a schematic diagram of a third embodiment of the transceiver circuitry 29 of FIG. 9 including a feedback path 140 electrically coupled to an output of the PA 70 that provides a noise canceller signal 142 (e.g., a feedback signal) to cancel or reduce a noise signal 143 generated by the PA 70. As previously discussed, the PA 70 may amplify the TX signal 92 with sufficient power for transmission via the antennas 20. However, in operation, the PA 70 may generate a noise signal 143 within the RX frequency band, which may pass through the isolation circuitry 26 (e.g., including the first balun 98 and the second balun 100) and arrive at the RX circuitry 54. For example, the noise signal 143 may be a result of non-linear characteristics of the PA 70. To compensate for or reduce the noise signal 143, the feedback path 140 may include circuitry to generate the noise canceller signal 142.

The feedback path 140 may include phase adjustment circuitry 118, gain adjustment circuitry 120, and a BPF 144. The phase adjustment circuitry 118 may adjust a phase of the noise canceller signal 142 to be 180 degree out of phase from the noise signal 143. In some embodiments, the transceiver circuitry 29 may include phase sensing circuitry to determine the phase of the noise signal 143, so that the phase adjustment circuitry 118 may better tune the phase of the noise canceller signal 142 to be 180 degrees out of phase compared to the noise signal 143. Moreover, the gain adjustment circuitry 120 may adjust an amplitude of the noise canceller signal 142 to correlate to or match the amplitude of the noise signal 143 to reduce or cancel the noise signal 143. In some embodiments, the transceiver circuitry 29 may include gain or amplitude sensing circuitry to determine the amplitude of the noise signal 143, so that the gain adjustment circuitry 120 may better tune the amplitude of the noise canceller signal 142 to correlate to or match the amplitude of the noise signal 143. As such, the feedback path 140 may provide the noise canceller signal 142 to the RX circuitry 54 to reduce or compensate for an effect of the noise signal 143 on RX signals.

Figure 13:
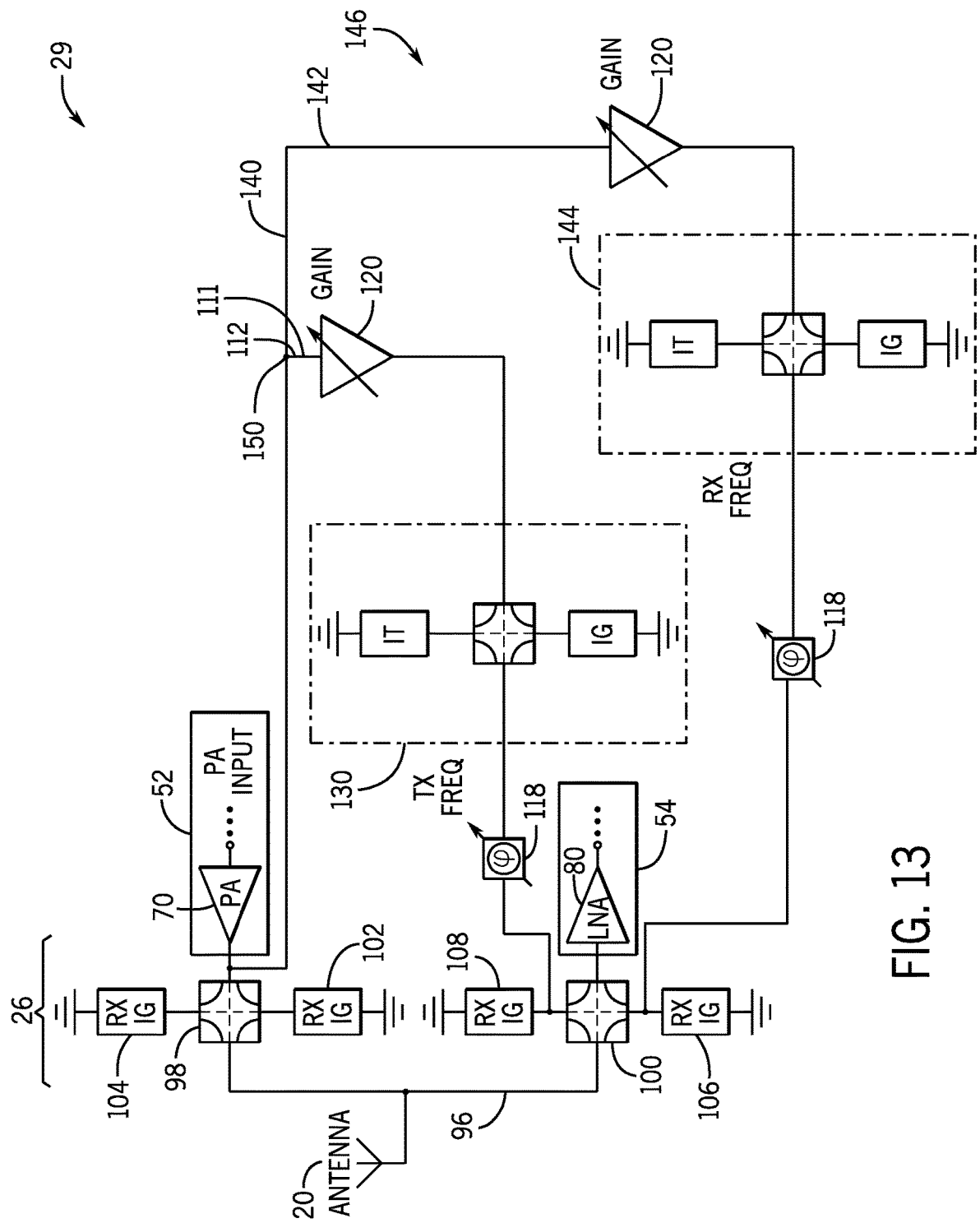
FIG. 13 is a schematic diagram of an example embodiment of the transceiver circuitry of the electronic device of FIG. 1 that reduces or compensates for leakage and noise signals associated with a transmission signal at the receiver circuitry using two feedback paths according to the embodiments of FIG. 10 and FIG. 12.

FIG. 13 is a circuit diagram of an implementation of the second and third embodiments of the transceiver circuitry 29 as illustrated in FIGS. 11 and 12, according to embodiments of the present disclosure. In particular, additional isolation circuitry 146 (e.g., in addition to the isolation circuitry 26) may be disposed on feedback paths 111, 140. The feedback paths 111, 140 may each electrically couple to the TX circuitry 52 at the output of the PA 70 (e.g., between the output of the PA 70 and the isolation circuitry 26) such that they may split from a node 129.

The TX IG 102 and the TX IT 104 may include unmatched impedance with respect to signals within the TX frequency band. As such, a TX signal may traverse the first balun 98 to the shared signal path 96 for transmission by the one or more antennas 20. However, due to real-world deficiencies in the RX IG 106, the RX IT 108, and/or the second balun 100, among other components, a portion of the TX signal (e.g., a leakage signal 116) may leak to the RX circuitry 54 (instead of being transmitted via the one or more antennas 20). If left uncompensated, the leakage signal 116 may desense the RX circuitry 54 and/or interfere with RX signals received at the RX circuitry 54. Moreover the PA 70 of the TX circuitry 52 may generate a noise signal 143 due to non-linear characteristics of the PA 70. Such noise signals may be distributed across a wide frequency range. If left uncompensated, the noise signal 143 within the RX frequency range may traverse through the first balun 98 and the second balun 100 and may desense the RX circuitry 54.

As such, the feedback path 111 may provide the leakage canceller signal 112 to cancel the leakage signal 116 of the TX signal and the feedback path 140 may provide the noise canceller signal 142 to cancel the noise signal 143 generated by the PA 70. In particular, the feedback path 111 may include the phase adjustment circuitry 118 that enables adjusting the phase of the leakage canceller signal 112 to be 180 degrees out of phase with respect to the leakage signal 116, the gain adjustment circuitry 120 that enables adjusting the amplitude of the leakage canceller signal 112 to correlate to the amplitude of the leakage signal 116, and the BPF 130 that filters out signals with frequencies outside of the TX frequency band. In some embodiments, the BPF 130 may include a balun with respective IG and IT components to enable signals within the TX frequency band to pass through and prevent signals outside the TX frequency band from passing through. As such, the leakage canceller signal 112 traversing the feedback path 111 may cancel the leakage signal 116 of the TX signal.

Moreover, the feedback path 140 may include the phase adjustment circuitry 118 that enables adjusting the phase of the noise canceller signal 142 to be 180 degrees out of phase with respect to the noise signal 143, the gain adjustment circuitry 120 that enables adjusting the amplitude of the noise canceller signal 142 to correlate to the amplitude of the noise signal 143, and the BPF 144 that filters out signals with frequencies outside of the RX frequency band. In some embodiments, the BPF 144 may include a balun with respective IG and IT components to enable signals within the RX frequency band to pass through and prevent signals outside the RX frequency band from passing through. As such, the noise canceller signal 142 traversing the feedback path 140 may cancel the noise signal 143 generated by the PA 70.

Figure 14:
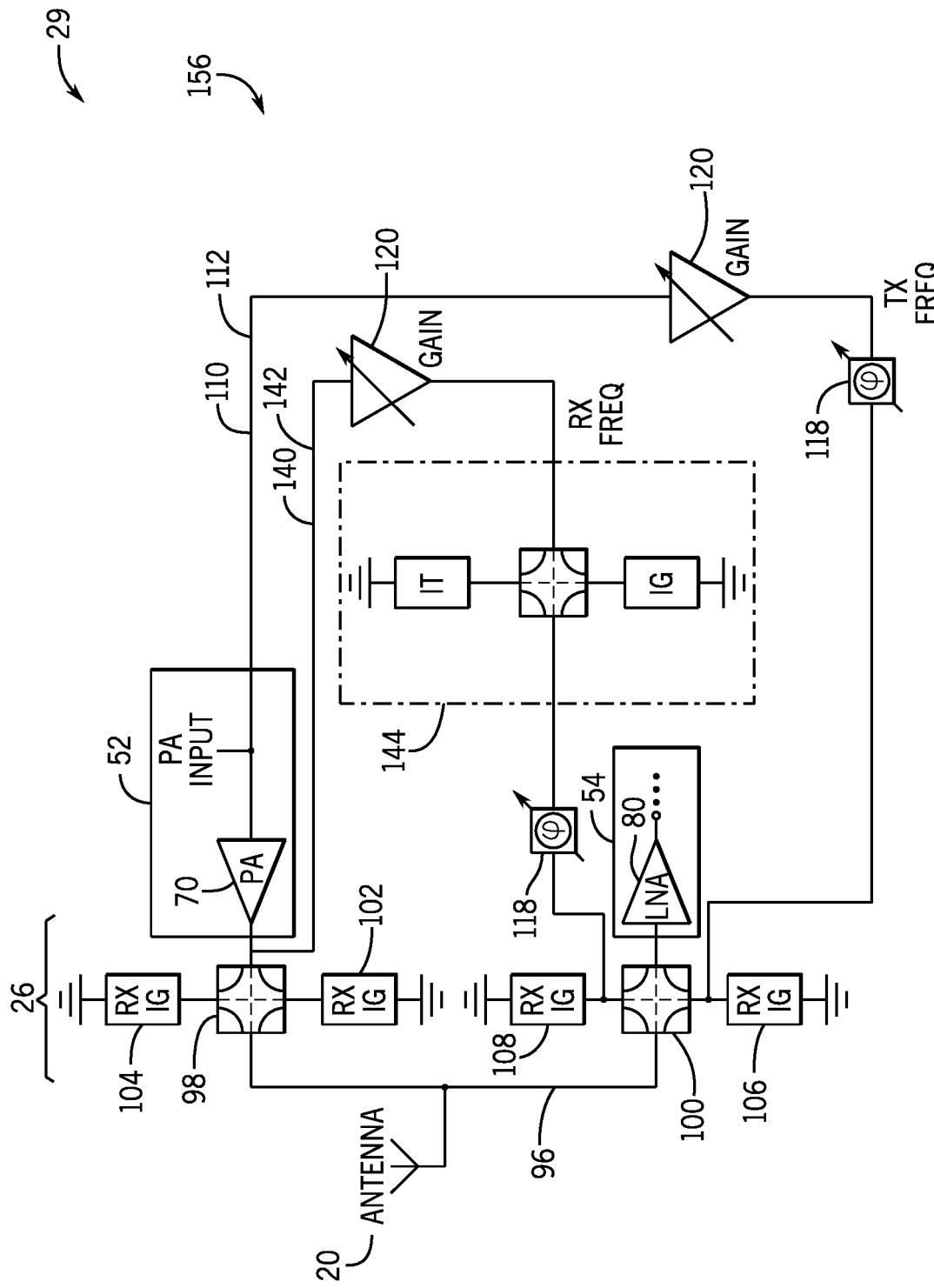
FIG. 14 is a schematic diagram of another example embodiment of the transceiver circuitry of the electronic device of FIG. 1 that reduces or compensates for leakage and noise signals associated with a transmission signal at the receiver circuitry using two feedback paths according to the embodiments of FIG. 11 and FIG. 12.

FIG. 14 is a circuit diagram of another example of the transceiver circuitry 29 of the electronic device of FIG. 1. Additional isolation circuitry 156 may include the first embodiment and the third embodiment of the transceiver circuitry 29, as described above, to provide the leakage canceller signal 112 and the noise canceller signal 142. The additional isolation circuitry 156 may use the feedback path 110 and the feedback path 140. The feedback path 110 may couple the input of PA 70 and the feedback path 140 may couple the output of the PA 70 (e.g., before the isolation circuitry 26). It should be understood that because the transceiver circuitry 29 of FIG. 14 couples the feedback path 110 to an input of the PA 70, the noise generated by the PA 70 may not be included in the leakage canceller signal 112, and, as such, the BPF 130 may be unnecessary in this embodiment.

Similar to the example of FIG. 13, the TX IG 102 and the TX IT 104 may include unmatched (and unbalanced) impedance with respect to signals within the TX frequency band. As such, a TX signal may traverse the first balun 98 to the shared signal path 96 for transmission by the antennas 20. However, due to real-world deficiencies in characteristics of the RX IG 106, the RX IT 108, the second balun 100, among other possibilities, the second balun 100 may leak a portion of the TX signal to the LNA 80 and the RX circuitry. The leakage signal (e.g., leakage signal 116) may desense the RX circuitry and cause interference when receiving RX signals. Moreover, the PA 70 of the TX circuitry may generate noise signals, for example, due to non-linear characteristic of the PA 70. Such noise signals may dissipate across a wide frequency range. A portion of the noise signals that are within the RX frequency range may traverse through the first balun 98 and the second balun 100 and may desense the RX circuitry.

As such, the feedback path 110 may provide the leakage canceller signal 112 (not shown in FIG. 13) to cancel the leakage current (e.g., leakage signal 116) of TX signal and the feedback path 140 may provide the noise canceller signal 142 to cancel the noise signals (e.g., noise signals 143) before the LNA 80 of the RX circuitry 54. In particular, the feedback path 110 may include the phase adjustment circuitry 118 that enables adjusting the phase of the leakage canceller signal 112 to be 180 degrees out of phase with respect to the leakage signal 116, the gain adjustment circuitry 120 that enables adjusting the amplitude of the leakage canceller signal 112 to correlate to the amplitude of the leakage signal 116. Since feedback path 110 is electrically coupled to the input of the PA 70, the leakage canceller signal 112 may include TX signals within TX frequency band.

Moreover, the feedback path 140 may include the gain adjustment circuitry 120, the BPF 144, and the phase adjustment circuitry 118. In some embodiments, the BPF 144 may include a balun with respective IG and IT components to provide signals within the RX frequency band from the TX circuitry to the RX circuitry. As such, the feedback path 140 may cancel the noise signals in the RX circuitry by providing the second feedback signal 142 using the gain adjustment circuitry 120, the BPF 144, and the phase adjustment circuitry 118.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. Radio frequency transceiver circuitry comprising:
   isolation circuitry electrically coupled to one or more antennas;
   transmit circuitry electrically coupled to the isolation circuitry and configured to send a transmission signal via the one or more antennas;
   receiver circuitry electrically coupled to the isolation circuitry and configured to receive a receive signal via the one or more antennas;
   first phase adjustment circuitry electrically coupled between the transmit circuitry and the receiver circuitry, the first phase adjustment circuitry configured to adjust a phase of a first feedback signal from the transmit circuitry and provide the first feedback signal, as adjusted, to the receiver circuitry to compensate for at least a portion of a noise signal at the receiver circuitry generated by the transmit circuitry when sending the transmission signal via the one or more antennas; and
   second phase adjustment circuitry electrically coupled between the transmit circuitry and the receiver circuitry, the second phase adjustment circuitry configured to adjust a phase of a second feedback signal from the transmit circuitry and provide the second feedback signal, as adjusted, to the receiver circuitry to compensate for at least a portion of a leakage signal at the receiver circuitry generated by the transmit circuitry when sending the transmission signal via the one or more antennas.

2. The radio frequency transceiver circuitry of claim 1, wherein the isolation circuitry comprises a first balun and a second balun, the first balun configured to electrically couple the transmit circuitry and the one or more antennas, and the second balun configured to electrically couple the receiver circuitry and the one or more antennas.

3. The radio frequency transceiver circuitry of claim 1, wherein the first phase adjustment circuitry comprises a balun configured to filter at least a portion of the first feedback signal outside of a frequency range of the receiver circuitry.

4. The radio frequency transceiver circuitry of claim 1, wherein the transmit circuitry comprises a power amplifier having an output electrically coupled to the first phase adjustment circuitry, the power amplifier configured to generate the noise signal.

5. The radio frequency transceiver circuitry of claim 1, wherein the second phase adjustment circuitry comprises a balun configured to filter at least a portion of the second feedback signal outside of a frequency range of the transmit circuitry.

6. The radio frequency transceiver circuitry of claim 1, comprising gain adjustment circuitry configured to adjust an amplitude of the second feedback signal to compensate for at least the portion of the leakage signal.

7. The radio frequency transceiver circuitry of claim 6, comprising amplitude sensing circuitry configured to determine an amplitude of the leakage signal, wherein the gain adjustment circuitry is configured to adjust the amplitude of the second feedback signal based on receiving the amplitude of the leakage signal from the amplitude sensing circuitry.

8. The radio frequency transceiver circuitry of claim 1, comprising phase sensing circuitry configured to determine a phase of the transmission signal, the first phase adjustment circuitry being configured to adjust the phase of the first feedback signal based on the phase of the transmission signal to compensate for the noise signal, the second phase adjustment circuitry being configured to adjust the phase of the second feedback signal based on the phase of the transmission signal to compensate for the leakage signal, or both.

9. An electronic device comprising:
- transmission circuitry configured to send a transmission signal to one or more antennas;
- receiver circuitry configured to receive a reception signal from the one or more antennas;
- a feedback path coupled to the transmission circuitry and the receiver circuitry configured to provide a feedback signal from the transmission circuitry to the receiver circuitry to compensate for a leakage signal or a noise signal at the receiver circuitry generated by the transmission signal when sending the transmission signal to the one or more antennas; and
- phase adjustment circuitry disposed on the feedback path and configured to adjust a phase of the feedback signal to compensate for the leakage signal or the noise signal.

10. The electronic device of claim 9, comprising isolation circuitry having
- a shared conductive path between the one or more antennas, the transmission circuitry, and the receiver circuitry,
- a first balun configured to provide electrical isolation between the transmission signal on the shared conductive path and the receiver circuitry, and
- a second balun configured to provide electrical isolation between the reception signal on the shared conductive path and the transmission circuitry.

11. The electronic device of claim 9, comprising a balun disposed on the feedback path, the balun configured to filter at least a portion of the feedback signal outside of a frequency range of the receiver circuitry.

12. The electronic device of claim 9, wherein the transmission circuitry comprises a power amplifier having an output electrically coupled to the feedback path.

13. The electronic device of claim 9, comprising a balun disposed on the feedback path, the balun configured to filter at least a portion of the feedback signal outside of a frequency range of the transmission circuitry.

14. The electronic device of claim 9, comprising gain adjustment circuitry disposed on the feedback path, wherein the gain adjustment circuitry is configured to adjust an amplitude of the feedback signal to compensate for the leakage signal.

15. The electronic device of claim 9, comprising phase sensing circuitry configured to determine a phase of the transmission signal, wherein the phase adjustment circuitry is configured to adjust the phase of the feedback signal based on the phase of the transmission signal to compensate for the noise signal, the leakage signal, or both.

16. An electronic device, comprising:
- one or more antennas;
- receiver circuitry coupled to the one or more antennas;
- transmission circuitry coupled to the one or more antennas;
- first phase adjustment circuitry coupled to the receiver circuitry and the transmission circuitry; and
- isolation circuitry coupled to the receiver circuitry, the transmission circuitry, and the one or more antennas, the isolation circuitry comprising a first balun coupled to the transmission circuitry and the one or more antennas and a second balun coupled to the receiver circuitry and the one or more antennas.

17. The electronic device of claim 16, wherein the first phase adjustment circuitry is configured to adjust a phase of a first feedback signal from the transmission circuitry to the receiver circuitry.

18. The electronic device of claim 16, comprising second phase adjustment circuitry coupled to the receiver circuitry and the transmission circuitry, the second phase adjustment circuitry configured to provide a second feedback signal from the transmission circuitry to the receiver circuitry.

19. The electronic device of claim 16, wherein the first phase adjustment circuitry comprises gain adjustment circuitry configured to adjust an amplitude of a first feedback signal from the transmission circuitry to the receiver circuitry.

20. The electronic device of claim 16, wherein the first phase adjustment circuitry comprises a band pass filter configured to filter at least a portion of one or more signals outside a first frequency range.

* * * * *